United States Patent
Kim et al.

(10) Patent No.: US 8,644,881 B2
(45) Date of Patent: Feb. 4, 2014

(54) MOBILE TERMINAL AND CONTROL METHOD THEREOF

(75) Inventors: Yoon-Ho Kim, Gyeonggi-Do (KR); Hye-Jin Oh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 257 days.

(21) Appl. No.: 12/797,505

(22) Filed: Jun. 9, 2010

(65) Prior Publication Data

US 2011/0111806 A1    May 12, 2011

(30) Foreign Application Priority Data

Nov. 9, 2009   (KR) ................. 10-2009-0107729

(51) Int. Cl.
  *H04M 1/00*   (2006.01)
  *H04B 1/38*   (2006.01)
  *G06F 3/02*   (2006.01)
  *H04N 5/262*  (2006.01)

(52) U.S. Cl.
   USPC ........ 455/556.1; 455/564; 345/168; 345/173; 348/239; 382/176

(58) Field of Classification Search
   USPC ................ 345/173; 348/239; 382/176
   See application file for complete search history.

(56) References Cited

U.S. PATENT DOCUMENTS

| | | | | |
|---|---|---|---|---|
| 6,473,523 B1* | 10/2002 | Newman et al. | ............. | 382/176 |
| 6,937,747 B2* | 8/2005 | Culp et al. | ............. | 382/113 |
| 7,787,693 B2* | 8/2010 | Siegemund | ............. | 382/176 |
| 8,059,897 B2* | 11/2011 | Xu et al. | ............. | 382/181 |
| 2002/0065728 A1* | 5/2002 | Ogasawara | ............. | 705/23 |
| 2003/0200078 A1* | 10/2003 | Luo et al. | ............. | 704/2 |
| 2005/0057669 A1* | 3/2005 | Wakefield | ............. | 348/239 |
| 2007/0035616 A1* | 2/2007 | Lee et al. | ............. | 348/14.16 |
| 2008/0115080 A1* | 5/2008 | Matulic | ............. | 715/778 |
| 2008/0168405 A1* | 7/2008 | Tolmasky et al. | ............. | 715/863 |
| 2008/0174570 A1* | 7/2008 | Jobs et al. | ............. | 345/173 |
| 2009/0148074 A1* | 6/2009 | Xu et al. | ............. | 382/313 |
| 2009/0276690 A1* | 11/2009 | Rothschild | ............. | 715/208 |

\* cited by examiner

*Primary Examiner* — Jinsong Hu
*Assistant Examiner* — William Nealon
(74) *Attorney, Agent, or Firm* — Birch, Stewart, Kolasch & Birch, LLP

(57) ABSTRACT

A method for controlling a mobile terminal, and which includes receiving, via an input unit, a selection signal indicating a selection of a predetermined button among multiple predetermined buttons on the mobile terminal, in which the multiple predetermined buttons corresponding to different preset functions executed on the mobile terminal; capturing, via a camera included on the mobile terminal, a preview image of an object upon receiving the selection signal; recognizing, via a controller included on the mobile terminal, a character string included in the captured preview image; and performing, via the controller, a preset function using the recognized character string and that corresponds to the selection of the predetermined button.

12 Claims, 6 Drawing Sheets

- S210 — DRIVE CAMERA WHEN FIRST BUTTON IS PRESSED
- S220 — DISPLAY IMAGE INPUTTED TO CAMERA IN PREVIEW MODE
- S230 — RECOGNIZE CHARACTER STRING INCLUDED IN INPUTTED IMAGE IN PREVIEW MODE
- S240 — DISPLAY RECOGNIZED CHARACTER STRING
- S250 — PERFORM CALL FUNCTION BASED ON RECOGNIZED CHARACTER STRING (INCLUDING NUMBERS) WHEN SECOND BUTTON IS PRESSED

MOBILE TERMINAL AND CONTROL METHOD THEREOF

CROSS-REFERENCE TO A RELATED APPLICATION

This application claims priority to Korean Patent Application No. 10-2009-0107729 filed on Nov. 9, 2009 in Korea, the entire contents of which is hereby incorporated by reference in its entirety.

BACKGROUND OF THE INVENTION

1. Field of the Invention

The present invention relates to a mobile terminal and corresponding method for recognizing character information in a preview image and performing a preset operation based on the recognized character information.

2. Description of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

SUMMARY OF THE INVENTION

Accordingly, one object of the present invention is to provide a novel mobile terminal and corresponding method for capturing a preview image, recognizing information in the preview image, and performing a specific operation on the recognized information based on the selection of a predetermined button among a plurality of buttons on the mobile terminal.

To achieve these and other advantages and in accordance with the purpose of the present invention, as embodied and broadly described herein, the present invention provides in one aspect a method for controlling a mobile terminal, and which includes receiving, via an input unit, a selection signal indicating a selection of a predetermined button among multiple predetermined buttons on the mobile terminal, in which the multiple predetermined buttons corresponding to different preset functions executed on the mobile terminal; capturing, via a camera included on the mobile terminal, a preview image of an object upon receiving the selection signal; recognizing, via a controller included on the mobile terminal, a character string included in the captured preview image; and performing, via the controller, a preset function using the recognized character string and that corresponds to the selection of the predetermined button.

In another aspect, the present invention provides a mobile terminal including an input unit configured to receive a selection signal indicating a selection of a predetermined button among multiple predetermined buttons on the mobile terminal, in which the multiple predetermined buttons corresponding to different preset functions executed on the mobile terminal; a camera configured to capture a preview image of an object upon receiving the selection signal; and a controller configured to recognize a character string included in the captured preview image, and to perform a preset function using the recognized character string and that corresponds to the selection of the predetermined button.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
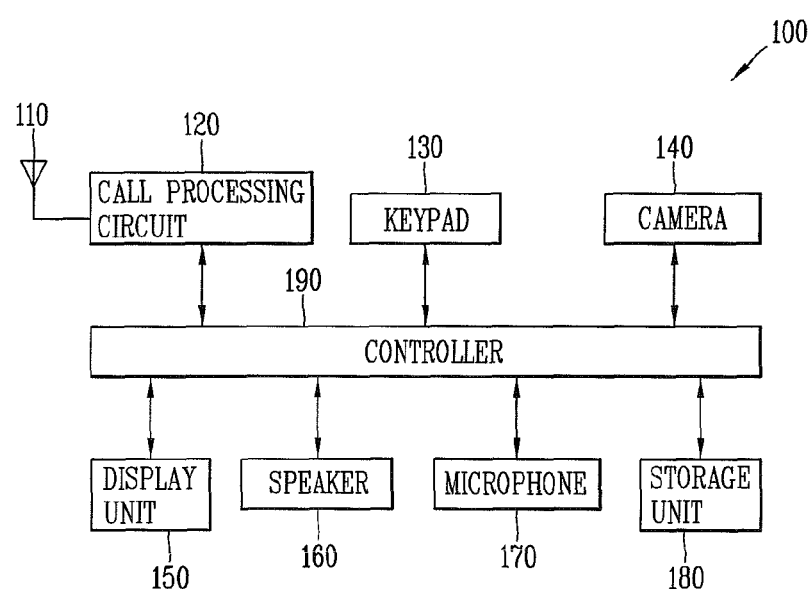
FIG. 1 is a block diagram illustrating a mobile terminal according to an embodiment of the present invention.

Exemplary embodiments of the present invention will now be described in detail with reference to the accompanying drawings. The same elements and equivalents as those in the construction are referred to as the same reference numerals and a detailed description therefor will be omitted for the sake of explanation.

FIG. 1 is a block diagram illustrating a mobile terminal 100 according to an embodiment of the present invention. Further, the mobile terminal 100 may be implemented in various forms. For example, the mobile terminal 100 may be a telematics terminal, a smart phone, a portable terminal, a personal digital assistant (PDA), a portable multimedia player (PMP) terminal, a notebook computer, a WiBro terminal, an Internet protocol television (IPTV) terminal, a navigation terminal, an audio video navigation (AVN) terminal, an audio/video (AN) system, and the like.

As shown in FIG. 1, the mobile terminal 100 includes an antenna 110, a call processing circuit 120, a keypad 130, a camera 140, a display unit 150, a speaker 160, a microphone 170, a storage unit 180, and a controller 190. The mobile terminal 100 may be implemented with more elements than those illustrated in FIG. 1 or may be implemented with less elements than those illustrated In FIG. 1.

The call processing circuit 120 codes a voice signal or a data signal with respect to an origination call according to a preset scheme, modulates the coded signal, and transmits the modulated signal to another terminal via the antenna 110. Also, the call processing circuit 120 receives a signal transmitted from another terminal with respect to a reception call via the antenna 110, demodulates the received signal, decodes the demodulated signal, and provides the decoded signal to the controller 190. The function of the call processing circuit 120 can also be performed by the controller 190.

In addition, the keypad 130, allowing a key input, may include an array of actual physical keys or be configured as a touch type keypad implemented by software. Further, the camera 140 processes image frames such as a still image, video, and the like, obtained by an image sensor (e.g., a CCD sensor, a CMOS sensor, etc.) in a video call mode, an image capture mode, a video conference mode, and the like. Namely, corresponding video data obtained by the image sensor according to a CODEC scheme are decoded to fit each standard. The processed image frames can then be displayed on the display unit 150 under the control of the controller 190.

In addition, the image frames processed by the camera 140 may be stored in the storage unit 180. The display unit 150 also displays an operational state of each element included in the mobile terminal 100 under the control of the controller 190. Further, the display unit 150 displays executed results of application programs (e.g., a calculator program, a search program, and the like) stored in the storage unit 180 under the control of the controller 190. Here, the display unit 150 may be configured to receive an input from the user by using a touch screen scheme.

Also, the display unit 150 can display various contents such as various menu screen images by using a user interface and/or graphic user interface included in the storage unit 180. Further, the contents displayed on the display unit 150 may include menu screen images including various text or image data (including map data or various information data) and data such as icons, a list menu, combo box, and the like. The display unit 150 also displays image information captured by the camera 140 under the control of the controller 190, and may include at least one of a Liquid Crystal Display (LCD), a Thin Film Transistor-LCD (TFT-LCD), an Organic Light Emitting Diode (OLED), a flexible display, a field emission display (FED), and a three-dimensional (3D) display.

In addition, the display unit 150 may include a haptic module that generates various tactile effects the user may feel. A typical example of the tactile effects generated by the haptic module is vibration. The strength, pattern, and the like of the vibration generated by the haptic module can also be controlled. For example, different vibrations may be combined to be output or sequentially output.

Besides vibration, the haptic module can generate various other tactile effects such as effects by stimulations such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat. The haptic module may be also implemented to allow the user to feel a tactile effect through a muscle sensation such as user's fingers or arm, as well as transferring the tactile effect through a direct contact. One or more haptic modules may also be provided according to an implementation form of the mobile terminal 100.

In addition, the speaker 160 outputs, for example, voice information included in a signal processed by the controller 190. Also, the speaker 160 outputs voice information included in results obtained by executing an application program under the control of the controller 190. Further, the microphone 170 can receive an external audio signal via a microphone in a phone call mode, a recording mode, a voice recognition mode, and the like, and process such signal into electrical audio (voice) data. The processed audio (voice) data can then be converted for output into a format transmittable to a mobile communication base station via a communication unit for the phone call mode. The microphone 170 may also use various types of noise canceling (or suppression) algorithms to cancel (or suppress) noise or interference generated in the course of receiving and transmitting audio signals.

Further, the keypad 130 and the microphone 170 may be implemented as a single input unit in the mobile terminal 100. Also, the input unit can receive a button manipulation by the user, or receive a command or a control signal according to a manipulation such as touching or scrolling a displayed screen image. In addition, the input unit can select a function desired by the user or receive information, and include various devices such as a touch screen, a jog shuttle, a stylus, a touch pen, and the like, besides the keypad 130 and the microphone 170.

In addition, the storage unit 180 includes, for example, a flash memory, a non-volatile memory, a DRAM, a volatile memory, etc. The flash memory stores an operating system for operating (or driving) the mobile terminal 100 and one or more application programs. In this instance, the application programs may include programs for a calculator, a voice call origination, a text message origination, an Internet access, a Web browser, WAP browser, an Internet data search, and the like.

Further, the DRAM temporarily stores data generated in the process of operating the controller 190. Also, the storage unit 180 stores various user interfaces (UIs) and/or graphic user interfaces (GUIs). Besides the flash memory and the DRAM, the storage unit 180 may include a storage medium such as a hard disk, a multimedia card micro type, a card-type memory (e.g., SD or DX memory, etc), read-only memory (ROM), an Electrically Erasable Programmable Read-Only Memory (EEPROM), a Programmable Read-Only memory (PROM), a Random Access Memory (RAM), a Static Random Access Memory (SRAM), a magnetic memory, a magnetic disk, an optical disk, and the like.

In addition, the controller 190 controls a general operation of the mobile terminal 100. For example, when a preset first button is selected (pressed/touched/clicked, etc.), the controller 190 operates or drives the camera 140. In this instance, the first button may be one of a button or a calculation function button for selecting a calculator function, a button or a call connection button including a call connection function button using a phone number, a call connection function button using a speed number, and a call connection function button using a URL for selecting a call connection function, a button or a search function button for selecting a search function, and a button or a camera operating button for operating the camera 140.

The controller 190 then displays an image captured by (input to/received by) the camera 140 on the display unit 150 in the preview mode. Further, the preview mode refers to an image capture standby state in which a certain image is received by the camera 140, rather than a state in which a still image or video is captured by the camera 140. The controller 190 also recognizes a character string including characters, numbers, symbols, etc. included in an image captured by the camera 140 in the preview mode.

The controller 190 then performs the function of a calculator program executed or operated in a background state or in a state of not being displayed on the screen based on the recognized character string, and displays the performing results on the display unit 150. In particular, the controller 190 classifies general text including a character string, symbols, and the like and cost information including information related to numbers and a fee in the recognized character string.

For example, the controller 190 classifies the recognized text 'Beat 2.5 Kg' as general text and '13,200 WON' as cost information in the character string 'Beat 2.5 Kg 13,200

WON.' The controller 190 can determine the text relates to cost information based on cost characteristics previously stored in the storage unit 180. For example, the previously stored price characteristics information may be the characteristics representing a monetary unit of each country. In more detail, the previously stored price characteristics information may be 'Won' for Korean currency and 'dollar' or '$' for the dollar. In this manner, the controller 190 can classify the characters or numbers included in the character string using the cost characteristics information as cost information based on the cost characteristics information, and classify other character string as general text.

The controller 190 also performs a preset function based on the recognized character string such as a call function, a search function, a calculation function, a particular display function, a particular haptic output function, an Internet function, a browser function, a translation function for translating a first language into a second language, etc. The controller 190 can also display results or information regarding the preset function on the display unit 150. Also, when a preset first button is selected, the controller 190 executes at least one of the calculator program, Internet connection program, Web browser, WAP browser, search program, etc. previously stored in the storage unit 180 in a background state. These features will be discussed in more detail later.

In addition, the mobile terminal 100 can perform a communication function with another terminal via a wireline/wireless communication network. The wireless Internet technique may include a wireless LAN (WLAN), Wi-Fi, Wireless Broadband (WiBro), World Interoperability for Microwave Access (WiMax), high speed downlink packet access (HSDPA), IEEE 802.16, long term evolution (LTE), wireless mobile broadcast service (WMBS), and the like. A short-range communication technique may also be used and includes Bluetooth™, radio frequency identification, infrared data association (IrDA), ultra-wideband (UWB), ZigBee™, and the like.

Figure 2:
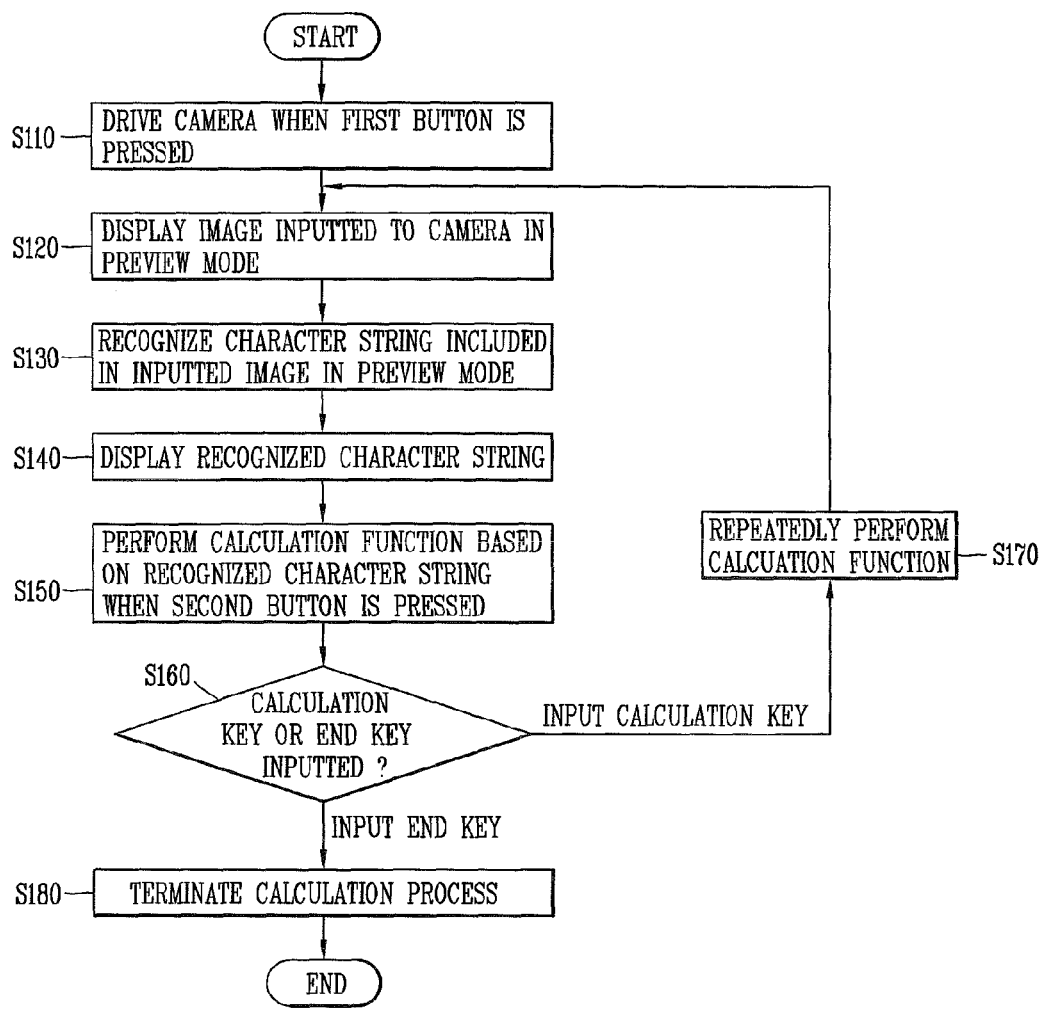
FIG. 2 is a flow chart illustrating a method for controlling a mobile terminal according to a first embodiment of the present invention.

Next, FIG. 2 is a flow chart illustrating a method for controlling a mobile terminal according to a first embodiment of the present invention. As shown, when the user selects a preset first button or key using the keypad 130, the controller 190 operates the camera 140 (S110). In addition, the preset first button may be a button for selecting the calculator function or a button for operating the camera 140. Thereafter, the controller 190 displays an image captured by the camera 140 in the preview mode on the display unit 150.

Further, the preview mode refers to an image capture standby state in which a certain image is received by the camera 140, rather than a state in which a still image or video is captured by the camera 140. In addition, when the camera 140 is operated, the controller 190 preferably changes the focus of the camera 140 to a preset zoom magnification and adjusts the focus according to an object in front of the focus-changed camera 140 to thereby shorten the time required for focus adjustment. The controller 190 can also adjust the focus of the camera 140 using an auto-focus function. For example, in the present embodiment, when the calculator program through image recognition is performed, an initial zoom magnification operated after the camera 140 is operated can correspond to a close-up mode.

Figure 3A:
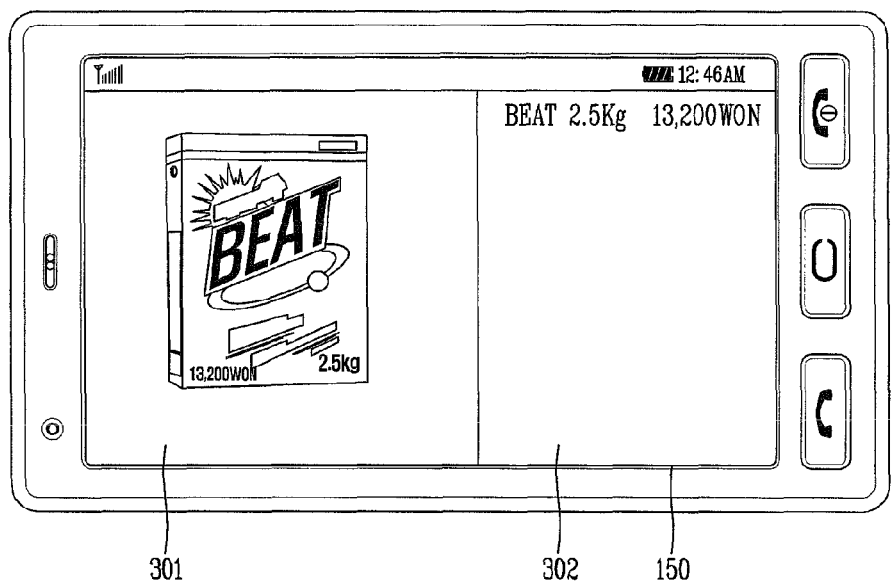
FIGS. 3A to 3D are overviews of display screens of a display unit according to the first embodiment of the present invention.

In addition, as shown in FIG. 2, the storage unit 180 stores the image captured by the camera 140 in the preview mode (S120). Thereafter, the controller 190 recognizes a character string including characters, numbers, symbols, etc. included in the recognized character string captured by the camera 140 (S130). The controller 190 then displays the recognized character string on a region of the display unit 150 (S140). For example, as shown in FIG. 3A, when an image of a detergent including the character string 'Beat 2.5 Kg 13,200 WON' is captured by the camera 140 in the preview mode, the controller 190 recognizes the character string and displays the image captured by the camera 140 on one region 301 of the display unit 150 and displays the recognized character string on another region 302 of the display unit 150.

Further, in one example, the controller 190 repeatedly performs the character string recognition and display process until the user selects as a preset second button (e.g., an 'OK' button or a 'capture' button). Thus, as shown in FIG. 2, when the user selects the preset second button, the controller 190 performs the function of a calculator program executed in a background state or a state in which information regarding the calculator program is not displayed on the screen by using the recognized character string (S150).

Figure 3B:
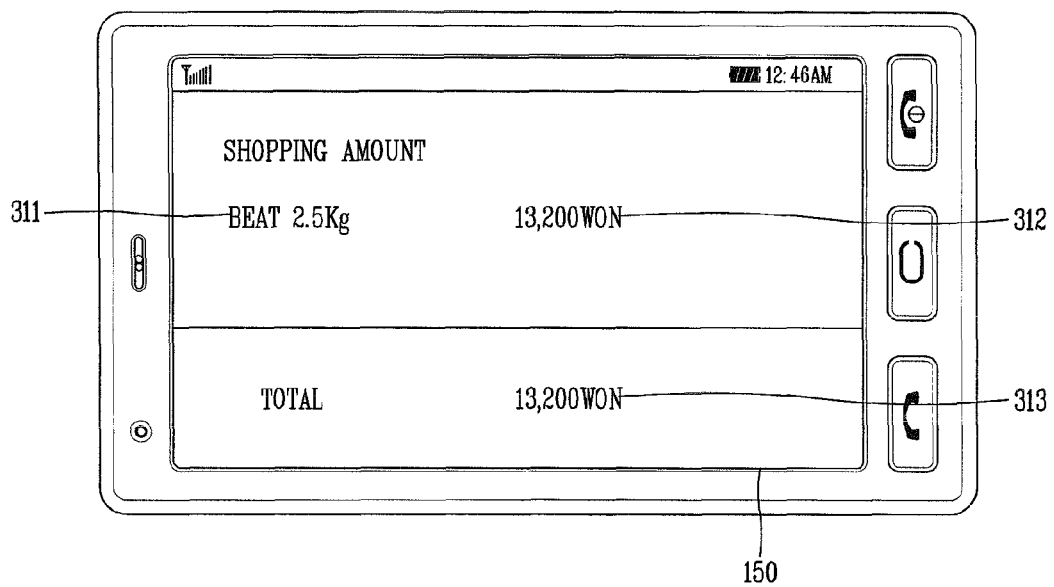

For example, when the user selects the 'OK' button, the controller 190 classifies the text 'Beat 2.5 Kg 13,200 WON' displayed on the display unit 150 into 'Beat 2.5 Kg' representing general text (e.g., including information such as the name of a product, a packing unit, and the like) and 13,200 WON' representing price information, calculates a total amount based on the classified general text information and the price information, and displays the calculated information on the display unit 150. Namely, as shown in FIG. 3B, the controller 190 displays general text information 311, price information 312, and the total amount 313 on the display unit 150, which are results of the calculator program execution results. Further, the controller 190 may perform the calculation function of the calculator program using only the price information.

The displayed calculated information can also include a price per unit (e.g., 13,200 Won/2.5 Kg=5280 Won/Kg) so the user can easily compare the price per unit against another product. Also, when a certain object including a certain character string is captured for more than a preset time via the camera 140, the controller 190 can automatically perform the function of the calculator program based on the recognized character string without the user pressing the second button.

Thereafter, the controller 190 checks whether or not a preset operation key or an end key is selected by the keypad 130 (S160). Also, when the user selects the preset operation key (e.g., +, =, *, /, etc.) using the keypad 130 (Yes in S160), the controller 190 performs the above-described steps S120 to S150 to repeatedly perform the character string recognition and calculation function performing process (S170).

Figure 3C:
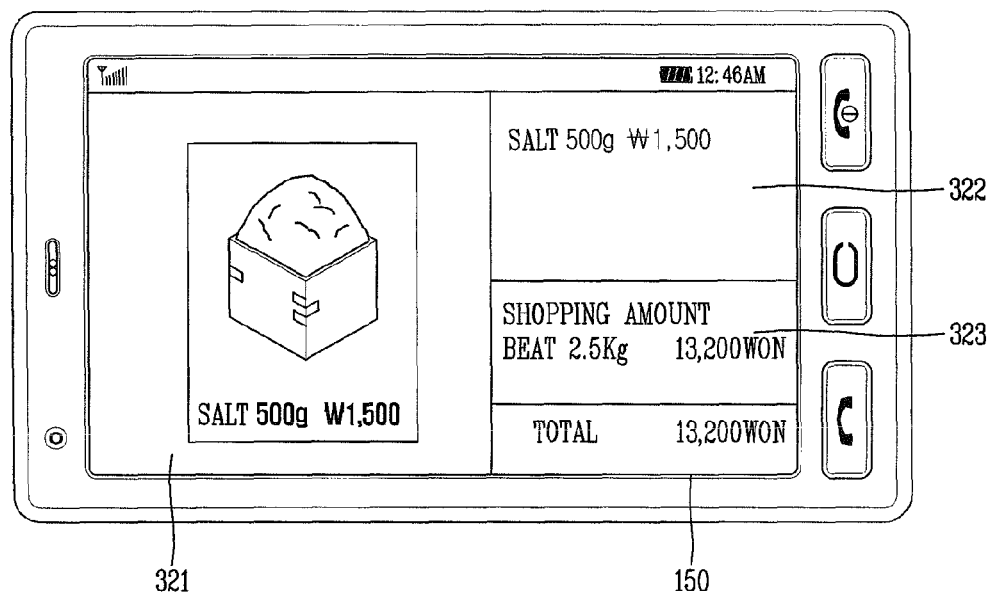

That is, when the user selects an operation sign '+' using the keypad 130, the controller 190 recognizes a character string included in another image captured by the camera 140 in the preview mode. For example, when the recognized character string is 'Salt 500 g\1,500' as shown in FIG. 3C, the controller 190 displays an image captured by the camera 140 on a region 321 of the display unit 150, displays the recognized character string on a region 322 of the display unit 150, and displays the calculator program execution result in the previous step (S150) on a region 323 of the display unit 150.

Figure 3D:
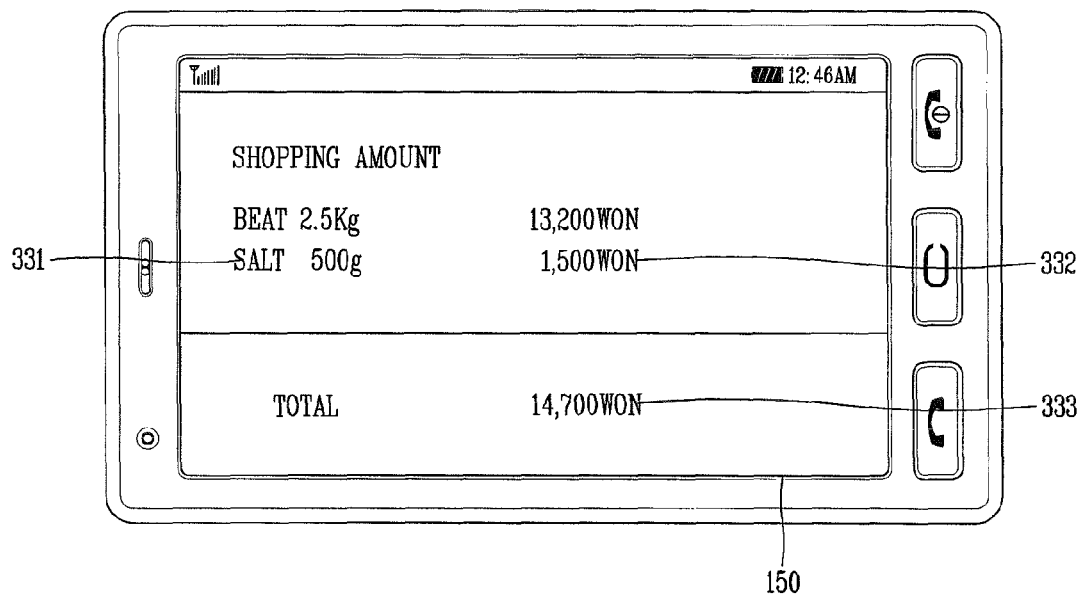

Thereafter, when the user selects the preset button, the controller 190 classifies the recognized character string 'Salt 500 g\1,500' into 'Salt 500 g' representing general text and '\1,500' representing price information, and calculates a total amount based on the classified general text information and the price information. Then, as shown in FIG. 3D, the controller 190 displays the general text information 331, the price information 332, and the total amount 333 on the display unit 150, which are the calculator program execution results.

Therefore, when an image of a certain new object including a certain character string is captured by the camera 140 in a state that the preset operation key or end key is not selected using the keypad 130, the controller 190 repeatedly performs the character string recognition and calculation function performing process by performing the foregoing steps S120 to S160. When the user selects the preset end key (e.g., '=, OK key, end key', etc.) using the keypad 130, the controller 190 displays the calculation result on the display unit 150 and terminates the calculation process (S180).

In this manner, the mobile terminal 100 can recognize the character string including characters, numbers, symbols, and the like included in the image captured by the camera, perform the calculation function based on the recognized character string according to the calculator program being executing in a background state, and display the calculation function performing results.

Figure 4:
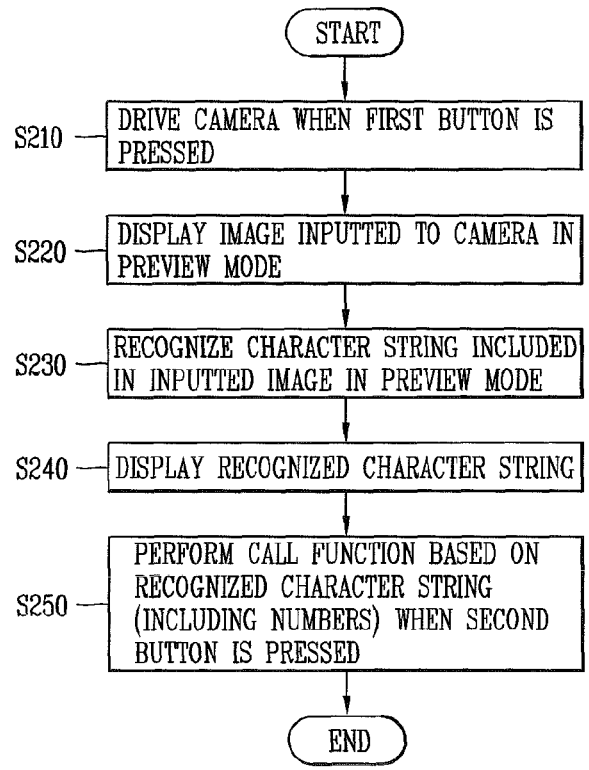
FIG. 4 is a flow chart illustrating a method for controlling a mobile terminal according to a second embodiment of the present invention.

Next, FIG. 4 is a flow chart illustrating a method for controlling a mobile terminal according to a second embodiment of the present invention. As shown, when the user selects a preset first button or a key using the keypad 130, the controller 190 operates the camera 140 (S210). Further, the preset first button may be a button for selecting a call connection function (for example, a button for providing a call connection function using a phone number, a button for providing a call connection function using a speed number, a button for providing a call connection function using a URL, and the like), or a button for operating the camera 140.

Thereafter, the controller 190 displays a preview image captured by the camera 140 in the preview mode on the display unit 150. As discussed above, the preview mode refers to an image capture standby state in which a certain image is received by the camera 140, rather than a state in which a still image or video is captured by the camera 140. Also, when the camera 140 is operated, the controller 190 may change the focus of the camera 140 to a preset zoom magnification and adjust the focus according to an object in front of the focus-changed camera 140 to thereby shorten the time required for focus adjustment. In addition, the controller 190 may adjust the focus of the camera 140 using an auto-focus function. For example, the controller 190 may set an initial zoom magnification immediately after the camera 140 is operated such that it corresponds to a close-up mode.

As shown in FIG. 4, the storage unit 180 stores the image captured by the camera 140 in the preview mode (S220). Thereafter, the controller 190 recognizes a character string including characters, numbers, symbols, etc. included in the recognized character string captured by the camera 140 (S230). The controller 190 then displays the recognized character string on a region of the display unit 150 (S240).

Figure 5:
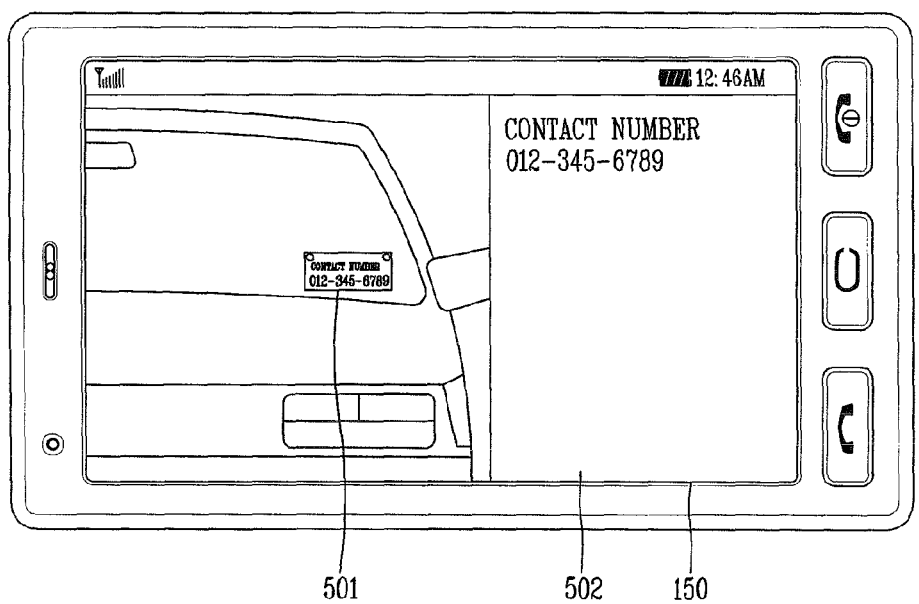
FIG. 5 is an overview of a display screen of a display unit according to the second embodiment of the present invention.

For example, as shown in FIG. 5, when an image of a contact number attached to a vehicle is captured by the camera 140 in the preview mode, a character string included in the captured image is recognized, and the recognized character string is 'contact number 012-345-6789'. The controller 190 then displays the image captured by the camera 140 on a region 501 of the display unit 150 and displays the recognized character string on a region 502 of the display unit 150.

Further, the controller 190 repeatedly performs the character string recognition and display process until the user selects as a preset second button (e.g., an 'OK' button or a 'capture' button) for acquiring the character string. Thereafter, when the preset second button is selected, the controller 190 classifies the recognized character string into information corresponding to numbers and general text including characters and symbols, and performs a call function based on the classified information corresponding to the numbers (S250).

For example, when the user selects the 'OK' button, the controller 190 classifies the 'contact number 012-345-6789' displayed on the display unit 150 into 'contact number, -' representing a general text including characters, symbols, etc. and '0123456789' representing numbers. The controller 190 then performs a call function with a terminal corresponding to the recognized numbers using the classified number information (e.g., '0123456789') (S250). In this manner, in the preview mode, the mobile terminal 100 can recognize the character string including characters, numbers, symbols, etc. included in the image captured by the camera and perform a call communication function with another terminal based on the recognized character string.

Figure 6:
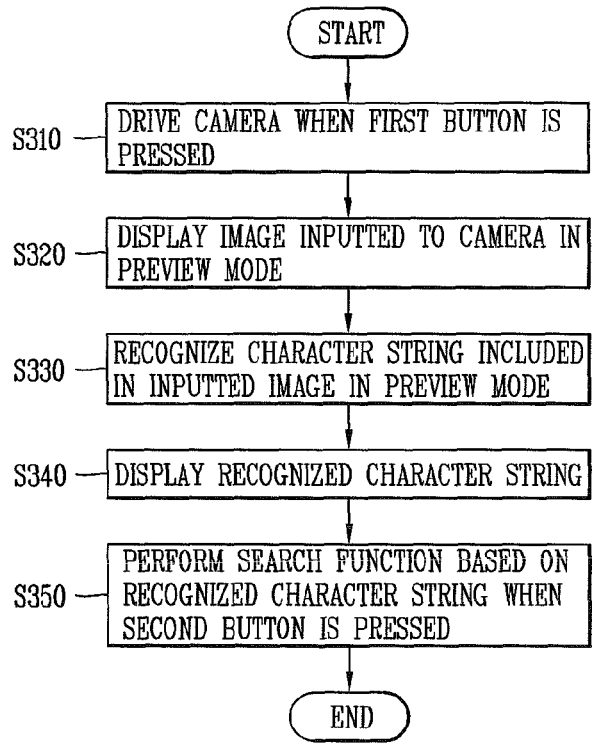
FIG. 6 is a flow chart illustrating a method for controlling a mobile terminal according to a third embodiment of the present invention.

Next, FIG. 6 is a flow chart illustrating a method for controlling a mobile terminal according to a third embodiment of the present invention. As shown, when the user selects a preset first button or a key using the keypad 130, the controller 190 operates the camera 140 (S310). In addition, in this embodiment, the preset first button may be a button for selecting a search function or a button for operating the camera 140.

Thereafter, the controller 190 displays an image captured by the camera 140 in the preview mode on the display unit 150 (S320). As discussed above, the preview mode refers to an image capture standby state in which a certain image is received by the camera 140, rather than a state in which a still image or video is substantially captured by the camera 140. In addition, when the camera 140 is operated, the controller 190 may change the focus of the camera 140 to a preset zoom magnification and adjust the focus according to an object in front of the focus-changed camera 140 to thereby shorten the time required for focus adjustment. Also, the controller 190 may adjust the focus of the camera 140 using an auto-focus function. For example, the controller 190 may set an initial zoom magnification immediately after the camera 140 is operated such that it corresponds to a close-up mode.

Figure 7:
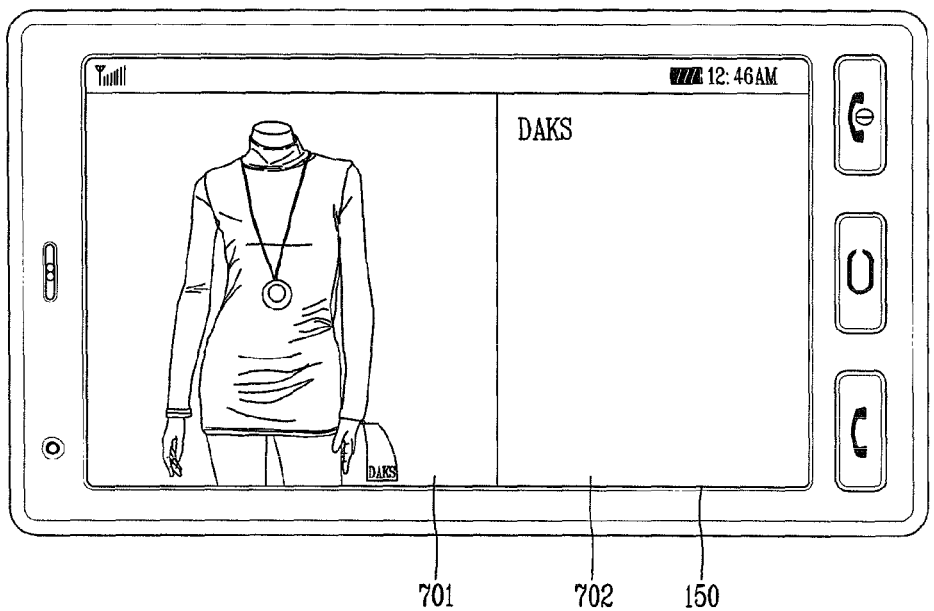
FIG. 7 is an overview of a display screen of a display unit according to the third embodiment of the present invention.

The storage unit 180 then stores the image captured by the camera 140 in the preview mode. Thereafter, the controller 190 recognizes a character string including characters, numbers, symbols, etc. included in the recognized character string captured by the camera 140 (S330), and displays the recognized character string on a region of the display unit 150 (S340). For example, as shown in FIG. 7, when an image of women's clothing is captured by the camera 140 in the preview mode, a character string included in the captured image is recognized (i.e., the recognized character string is 'DAKS'). The controller 190 then displays the image captured by the camera 140 on a region 701 of the display unit 150 and displays the recognized character string on a region 702 of the display unit 150 as shown in FIG. 7.

As discussed previously, the controller 190 repeatedly performs the character string recognition and display process until the user selects a preset second button (e.g., an 'OK' button or a 'capture' button) for acquiring a character string. Thereafter, when the user selects the preset second button, the controller 190 performs the function of a search program or one of an Internet access program, a Web browser, and a WAP browser in a background state or in a state of not being displayed on the screen using the recognized character string (S350).

For example, when the user selects the 'OK' button, the controller 190 searches information associated with the recognized character string DAKS' using the Microsoft Internet explorer, for example, and displays the search result on the display unit 150. Also, when an image of a certain object including a certain character string is captured by the camera 140 for more than a preset time, the controller 190 can automatically perform the search function based on the recognized character string.

In addition, when the recognized character string is a plurality of character strings, the controller 190 can perform a search function on each of the character strings and display each search function result on the display unit 150. Also, when the recognized character string is a plurality of character strings, the controller 190 can receive a certain selected character string according to a user input, perform a search function on the selected character string, and display the performing result on the display unit 150.

Thus, according to this embodiment of the present invention, the mobile terminal 100 can recognize the character string including characters, numbers, symbols, etc. included in the image captured by the camera 140 in the preview mode, perform a search function based on the recognized character string according to a search program being executing in a background state, and display the search results.

Therefore, according to the various embodiments of the present invention, the mobile terminal 100 can recognize a character string including characters, numbers, symbols, etc. included in an image captured by the camera in the preview mode state, perform a certain function based on the recognized character string according to a certain program being executing in a background state, and display the function performing results, whereby the sequential process of acquiring the image, recognizing the character string and executing the application program is simplified, and the time required for executing the application program is shortened.

In addition, in an alternative embodiment, the present invention can capture a preview image and then determine if there are any character or text information included in the preview image. If there is not any character or text information in the preview image, the controller 190 can notify the user of the same. Further, in the embodiments of the present invention, the user can use the camera provided on the terminal for performing additional functions such as a calculating function, a search function, etc. This significantly increases the capabilities provided by the mobile terminal.

In addition, if the user is previewing an image to be captured, the user can then select one of a plurality of different buttons to instruct the controller 190 to detect or find character strings in the preview image and then perform a particular function defined by the selected button. For example, the user can be viewing an image using the camera and then decide they want to perform a particular function. Thus, in this instance, the user can select the particular button they want to perform the particular function. For example, the user may be viewing an image that has a phone number in it, and the user can select the phone number call button to instruct the controller to search the image for the phone number, display the phone number and call the phone number.

The function button or particular button in the embodiments can be one of a physical hardware button, a proximity touch input, a soft touch button, a predetermined gesture, a voice command, etc. In still another embodiment, the user can view an image of a flyer for a music festival, for example, and capture the web page purchasing information. The controller 190 can then access the web page so the user can purchase tickets for the concert. If the user already has an account on the web page (e.g., Ticketmaster), the controller 190 can transmit the login information for the website so the tickets can be easily purchased.

In another embodiment, the user can capture an image of a first language (e.g., Spanish) and instruct the controller 190 to translate the first language into a second language (e.g., English). A translation dictionary can be stored in the memory or storage unit 180. Thus, if a user was eating at a Mexican restaurant, for example, the user could easily see an English translation of a particular menu item.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal, the method comprising:
   receiving a first selecting input indicating a selection of an icon among a plurality of icons displayed on a display unit of the mobile terminal, wherein the display unit is touch sensitive;
   operating a camera when the icon is selected;
   displaying a preview image received by the camera on the display unit in a preview mode, wherein the preview mode is displaying the preview image without storing the preview image to a memory and recognizing, via a controller of the mobile terminal, data included in the preview image;
   converting, via the controller, first information corresponding to the recognized data into second information; and
   displaying the converted second information with at least part of the preview image on the display unit without the preview image being stored,
   wherein the displaying the preview image, recognizing the data, converting the first information into the second information, and displaying the converted second information with at least part of the preview image is continuously performed until a second selecting input is received,
   wherein the first information is a first language information and the second information is a second language information,
   wherein the plurality of icons correspond to different functions and the selected icon is matched with a translation function for translating the first language information into the second language information,
   wherein when a focus of the camera is changed, the method further comprises:
   displaying another preview image different from the preview image in the preview mode;
   recognizing, via the controller, data included in the another preview image;
   converting, via the controller, the first information corresponding to the recognized data included in the another preview image into the second information; and
   displaying the converted second information with at least part of the another preview image on the display unit without the another preview image being stored, and wherein when the second selecting input is received while the preview image is displayed, the method further comprises:
storing the preview image to the memory, and
displaying continuously the converted second information with the stored preview image.

2. The method of claim 1, wherein when the camera is operated, the method further comprises adjusting the focus of the camera to automatically recognize the data included in the preview image.

3. The method of claim 1, further comprising:
setting a zoom magnification of the camera to a preset zoom magnification immediately after the camera is operated such that a time required for recognizing the data included in the preview image is reduced.

4. The method of claim 1, wherein the display unit includes at least two display regions, and
wherein the preview image is displayed on a first display region and the converted second information is displayed on a second display region.

5. The method of claim 1, wherein the recognized data includes at least one of numbers, characters and symbols included in the preview image.

6. A mobile terminal, comprising:
a touch screen display unit configured to receive a touch selection signal indicating a selection of an icon among a plurality of icons displayed on the display unit;
a camera; and
a controller configured to:
display a preview image received by the camera on the display unit in a preview mode, wherein the preview mode is displaying the preview image without storing the preview image to a memory,
recognize data included in the preview image,
convert first information corresponding to the recognized data into second information,
display the converted second information with at least part of the preview image on the display unit without the preview image being stored, and
continuously perform the displaying of the preview image, the recognizing of the data, the converting of the first information into the second information, and displaying of the converted second information with at least part of the preview image until a second selecting input is received,
wherein the first information is a first language information and the second information is a second language information,
wherein the plurality of icons correspond to different functions and the selected icon is matched with a translation function for translating the first language information into the second language information,
wherein when a focus of the camera is changed, the controller is further configured to:
display another preview image different from the preview image in the preview mode,
recognize data included in the another preview image,
convert the first information corresponding to the recognized data included in the another preview image into the second information, and
display the converted second information with at least part of the another preview image on the display unit without another preview image being stored, and
wherein when the second selecting input is received, the controller is further configured to:
stored the preview image to the memory, and
display continuously the converted second information with the stored preview image.

7. The mobile terminal of claim 6, wherein when the camera is operated, the controller is further configured to adjust the focus of the camera to automatically recognize the data included in the preview image.

8. The mobile terminal of claim 6, wherein the controller is further configured to set a zoom magnification of the camera to a preset zoom magnification immediately after the camera is operated such that a time required for recognizing the data included in the preview image is reduced.

9. The mobile terminal of claim 6, wherein the display unit includes at least two display regions, and
wherein the controller is further configured to display the preview image on a first display region and the converted second information on a second display region.

10. The mobile terminal of claim 6, wherein the recognized data includes at least one of numbers, characters and symbols included in the preview image.

11. The method of claim 1, wherein another one of the displayed icons corresponds to a calling function for calling a number included in the preview image, a calculating function for calculating prices included in price information in the preview image, and a searching function for searching for information included in the preview image.

12. The mobile terminal of claim 6, wherein another one of the displayed icons corresponds to a calling function for calling a number included in the preview image, a calculating function for calculating prices included in price information in the preview image, and a searching function for searching for information included in the preview image.

* * * * *